(12) United States Patent
Park et al.

(10) Patent No.: US 8,928,215 B2
(45) Date of Patent: Jan. 6, 2015

(54) ELECTRON EMISSION ELEMENT AND METHOD FOR MANUFACTURING THE SAME

(71) Applicant: Intellectual Discovery Co., Ltd., Seoul (KR)

(72) Inventors: Jin Seok Park, Ansan-si (KR); Bu Jong Kim, Ansan-si (KR); Won Kim, Ansan-si (KR); Sang Hyuk Lee, Ansan-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 13/868,182

(22) Filed: Apr. 23, 2013

(65) Prior Publication Data

US 2014/0292181 A1    Oct. 2, 2014

(30) Foreign Application Priority Data

Mar. 27, 2013   (KR) .................. 10-2013-0033108

(51) Int. Cl.
*H01J 1/304*      (2006.01)
*H01J 9/02*       (2006.01)
*B82Y 30/00*      (2011.01)

(52) U.S. Cl.
CPC .............. *H01J 1/3042* (2013.01); *B82Y 30/00* (2013.01); *H01J 9/025* (2013.01); *H01J 2329/0431* (2013.01); *H01J 2201/30434* (2013.01); *H01J 2329/8615* (2013.01); *H01J 2329/861* (2013.01)
USPC ........................................... 313/309; 33/311

(58) Field of Classification Search
CPC .................... H01J 2329/86–2329/8615; H01J 2201/304–2201/30476
USPC ................... 313/495–497, 309–311
See application file for complete search history.

(56) References Cited

U.S. PATENT DOCUMENTS

| 2004/0099438 | A1* | 5/2004 | Arthur et al. .................... 427/96 |
| 2005/0184641 | A1* | 8/2005 | Armitage et al. ............. 313/495 |
| 2006/0043861 | A1* | 3/2006 | Liu ................................ 313/311 |
| 2009/0183770 | A1* | 7/2009 | Nguyen ....................... 313/309 |
| 2009/0309481 | A1* | 12/2009 | Chou et al. ................... 313/483 |

FOREIGN PATENT DOCUMENTS

JP       2003197131 A  *  7/2003

OTHER PUBLICATIONS

B.J. Kim, "Electron emission properties of carbon nanotubes grown on polymer substrates with high absorbency", International Conference on Metallurgical Coatings & Thin Films, Town & Country Resort Hotel and Convention Center San Diego, California, USA, Program Technical Sessions Abstracts Exhibition (Publication date: Apr. 23, 2012).

Bu-Jong Kim et al., "Field emission properties of carbon nanotube emitters using cellulose substrates," Korean Institute of Electrical Engineers, Summer Conference 2012 (Publication date: Jul. 18, 2012).

* cited by examiner

*Primary Examiner* — Mariceli Santiago
(74) *Attorney, Agent, or Firm* — Lexyoume IP Meister, PLLC (57) ABSTRACT

An electron emission device and a method of manufacturing the same are provided. The electron emission device includes i) a hydrophilic resin substrate and ii) carbon nano tubes that are positioned on the resin substrate. Surface roughness Ra of the resin substrate is 7.3 μm to 9.75 μm.

9 Claims, 8 Drawing Sheets

(a) Experimental Example 1    (b) Experimental Example 3

FIG. 8

ELECTRON EMISSION ELEMENT AND METHOD FOR MANUFACTURING THE SAME

CROSS-REFERENCE TO RELATED APPLICATION

This application is related to Korean Patent Application No. 2013-0033108 that was filed in the Korean Industrial Property Office on Mar. 27, 2013, "Enhancement of electron-emission and long-term stability in tip-type carbon nanotube field emitters by lithium coating", which is a material that was announced at the 39th ICMCTF on Apr. 23, 2012, and "Electric field emission characteristics of carbon nano tube emitter using cellulose substrate", which is a material that was announced at the 43rd summer scientific contest of Korean electric society on Jul. 8, 2012.

BACKGROUND OF THE INVENTION (a) Field of the Invention

The present invention relates to an electron emission device and a method of manufacturing the same. More particularly, the present invention relates to an electron emission device and a method of manufacturing the same that embody a high current density and a high electron emission degree by adjusting average surface roughness.

(b) Description of the Related Art

Due to excellent electric characteristics, mechanical characteristics, and chemical characteristics of a carbon nano tube, in a field of an X-ray tube, a fluorescent tube, and a flat plate display, the carbon nano tube is widely used as an electron emission source. Conventionally, an X-ray tube using a thermal electron emission source such as a tungsten filament has been widely used, but a much production cost is required, operation is performed in a high temperature condition, and power consumption is large. Particularly, because upon applying as a micro focusing X-ray electron source, it is difficult to form the X-ray tube in a small size and the X-ray tube is less used due to a short life-span.

As a general electron emission source, a structure that forms a buffer layer in a metal tip that is formed with tungsten and that forms a catalyst material and that grows a carbon nano tube is much used. In such a structure, because of multi-layered structural characteristics, the structure has large contact resistance, thereby the large contact resistance becomes a cause that reduces a voltage supply for electron emission and therefore when the X-ray tube operates in a high pressure for a long time, a much heat occurs and adhesion is thus deteriorated. Therefore, important characteristics of a threshold voltage, a maximum emission current, reliability, and a life-span are deteriorated.

SUMMARY OF THE INVENTION

The present invention has been made in an effort to provide an electron emission device having advantages of a high current density and an electron emission degree by adjusting average surface roughness. The present invention has been made in an effort to further provide an method of manufacturing the electron emission device.

An exemplary embodiment of the present invention provides an electron emission device including i) a hydrophile resin substrate; and ii) carbon nano tubes that are positioned on the resin substrate. Average surface roughness Ra of the resin substrate is 7.3 µm to 9.7 µm. Preferably, the average surface roughness Ra of the resin substrate may be 9.2 µm to 9.4 µm.

The carbon nano tubes may have a diameter of 10 nm to 15 nm, when the carbon nano tubes are a multi-walled carbon nano tube. the carbon nano tubes may have a diameter of 1 nm to 2 nm when the carbon nano tubes are a single wall carbon nano tube.

The resin substrate may include a plurality of fiber strands, and an average length of the plurality of fiber strands may be 1 mm to 2 mm. The resin substrate may have flexibility. An average thickness of the resin substrate may be 400 µm to 500 µm. The resin substrate may be concavely bent toward a direction in which the carbon nano tubes are exposed to the outside. The resin substrate may include at least one resin that is selected from a group consisting of cellulose and polyester.

Another embodiment of the present invention provides a method of manufacturing an electron emission device including i) providing a resin substrate; ii) refining carbon nano tubes; iii) providing a suspension by distributing the carbon nano tubes in an aqueous solution; iv) providing the carbon nano tubes on the resin substrate by dipping the resin substrate in the suspension; v) drying the resin substrate; and vi) taping the resin substrate.

The refining of carbon nano tubes may include i) producing a mixed liquid by mixing the carbon nano tubes to sulfuric acid and nitric acid; ii) distributing the mixed liquid with ultrasonic waves; and iii) stirring the mixed liquid that is distributed with ultrasonic waves; and iv) filtering the stirred mixed liquid. The providing of a suspension may include i) providing an aqueous solution in which refining water, a dispersant, and the carbon nano tubes are mixed; and ii) distributing the aqueous solution with ultrasonic waves.

In the providing of an aqueous solution, a weight of the refining water may be one time to two times greater than that of the dispersant. The method may further include washing the resin substrate before the drying of the resin substrate.

X-rays of an enough amount can be generated using a resin substrate. Further, stability can be secured when driving for a long time using a resin substrate.

DETAILED DESCRIPTION OF THE EMBODIMENTS

When it is said that any part, such as a layer, film, region, or plate, is positioned on another part, it means the part is directly on the other part or above the other part with at least one intermediate part. In contrast, when an element is referred to as being "directly on" another element, there are no intervening elements present.

Technical terms used here are to only describe a specific exemplary embodiment and are not intended to limit the present invention. Singular forms used here include a plurality of forms unless phrases explicitly represent an opposite meaning. A meaning of "comprising" used in a specification embodies a specific characteristic, area, integer, step, operation, element and/or component and does not exclude presence or addition of another characteristic, area, integer, step, operation, element, component and/or group.

Terms representing relative space of "low" and "upper" may be used for more easily describing a relationship to another portion of a portion shown in the drawings. Such terms are intended to include other meanings or operations of an using apparatus together with a meaning that is intended in the drawings. For example, when an apparatus is inverted in the drawings, any portion described as disposed at a "low" portion of other portions is described as being disposed at an "upper" portion of other portions. Therefore, an illustrative term of "low" includes entire upper and lower directions. An apparatus may rotate by 90° or another angle, and a term representing relative space is accordingly analyzed.

Although not differently defined, entire terms including a technical term and a scientific term used here have the same meaning as a meaning that may be generally understood by a person of common skill in the art. It is additionally analyzed that terms defined in a generally used dictionary have a meaning corresponding to a related technology document and presently disclosed contents and are not analyzed as an ideal or very official meaning unless stated otherwise.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
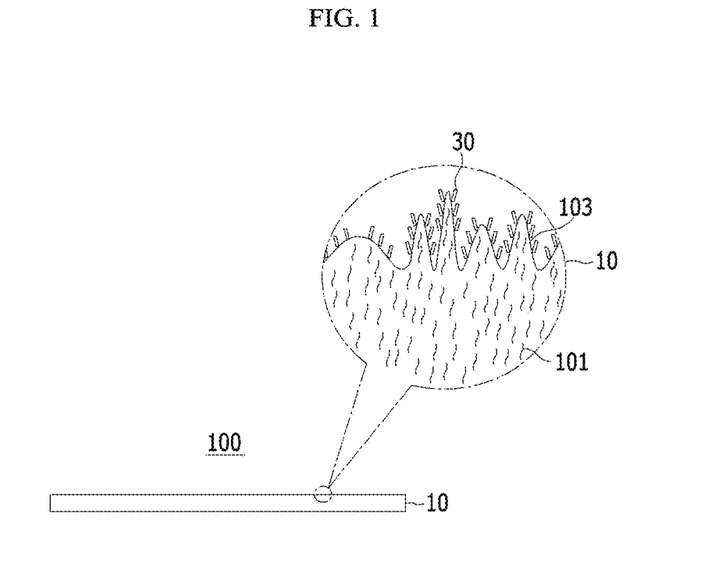
FIG. 1 is a diagram illustrating an electron emission device according to a first exemplary embodiment of the present invention.

FIG. 1 is a diagram illustrating an electron emission device 100 according to a first exemplary embodiment of the present invention. Meanwhile, an enlarged circle of FIG. 1 illustrates an enlarged surface of the electron emission device 100. A structure of the electron emission device 100 of FIG. 1 is merely to illustrate the present invention and the present invention is not limited thereto. Therefore, the electron emission device may be changed in other forms.

As shown in the enlarged circle of FIG. 1, the electron emission device 100 includes a resin substrate 10 and carbon nano tubes 30. In addition, the electron emission device 100 may further include other elements, as needed. The resin substrate 10 includes randomly entangled fiber strands 101.

The resin substrate 10 has average surface roughness Ra of 7.3 µm to 9.7 µm. When average surface roughness Ra of the resin substrate 10 is too low, molecular bonding of the resin substrate 10 and the carbon nano tubes 30 is not well performed. Further, due to flexible characteristics of the resin substrate 10, average surface roughness Ra of the resin substrate 10 cannot greatly increase. Therefore, it is preferable to maintain average surface roughness Ra of the resin substrate 10 to the foregoing range. More preferably, the average surface roughness Ra of the resin substrate 10 may be 9.2 µm to 9.4 µm. As described above, by adjusting the average surface roughness Ra of the resin substrate 10, while deriving good molecule binding between the carbon nano tubes 30 and the resin substrate 10, electric field emission characteristics of the electron emission device 100 are improved. As a result, the electron emission device 100 having improved stability of the carbon nano tubes 30 can be produced.

Meanwhile, the resin substrate 10 has a hydrophilic property. As a result, when the electron emission device 100 is produced by using the resin substrate 10, a production time and cost of the electron emission device 100 can be reduced.

The resin substrate 10 includes a plurality of fiber strands 101. An average length of the plurality of fiber strands may be 1 mm to 2 mm. If the average length of the plurality of fiber strands is too small, surface roughness increase after taping is limited. If the average length of the plurality of fiber strands is too large, the fiber strands are seriously entangled and thus it is difficult to vertically arrange fiber strands by taping. Therefore, it is preferable to adjust the average length of the plurality of fiber strands to the foregoing range.

Meanwhile, as the carbon nano tube 30 that is shown in an enlarged circle of FIG. 1, a multi-walled carbon nano tube may be used. A diameter of the multi-walled carbon nano tube may be 10 nm to 15 nm. When a diameter of the multi-walled carbon nano tube is too large, an aspect ratio thereof is deteriorated and thus electron emission characteristics may be deteriorated. Further, in view of design characteristics, when the multi-walled carbon nano tube is produced in a very small diameter, a production process becomes complicated and a production cost greatly increases. Therefore, it is preferable to adjust a diameter of the multi-walled carbon nano tube to the foregoing range.

Furthermore, as the carbon nano tube 30, a single wall carbon nano tube may be used. A diameter of the single wall carbon nano tube may be 1 nm to 2 nm. In view of design characteristics, when a diameter of a single wall carbon nano tube is too large, an aspect ratio thereof is deteriorated and thus electron emission characteristics may be deteriorated. That is, when the electron emission device 100 emits electrons, the electron emission device 100 may be damaged by glow discharge and arc discharge due to a collision with remaining particles within a vacuum chamber. Moreover, in view of design characteristics, when the multi-walled carbon nano tube is produced in a very small diameter, a production process becomes complicated and a production cost largely increases. Therefore, it is preferable to adjust a diameter of a single wall carbon nano tube to the foregoing range.

As shown in an enlarged circle of FIG. 1, a plurality of protruded portions 103 can be formed on the resin substrate 10 by taping. That is, by repeating a work of attaching a tape to the resin substrate 10 and detaching a tape from the resin substrate 10, the protruded portion 103 of various heights may be formed. The carbon nano tubes 30 are attached to the protruded portion 103 to function as an electron emission source.

Figure 2:
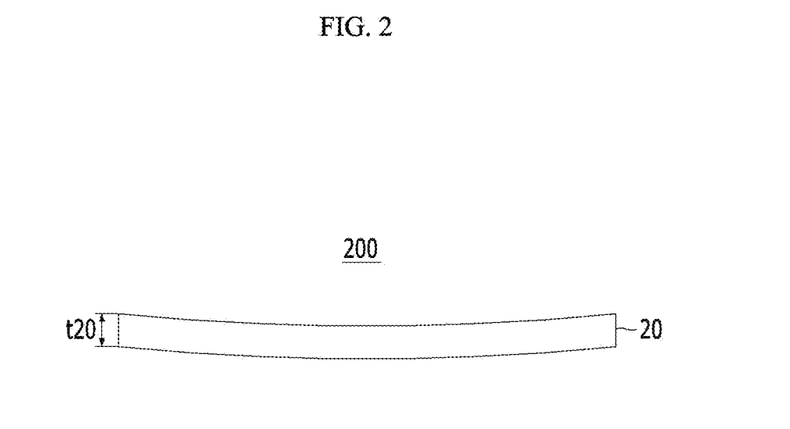
FIG. 2 is a diagram illustrating an electron emission device according to a second exemplary embodiment of the present invention.

FIG. 2 is a diagram illustrating an electron emission device 200 according to a second exemplary embodiment of the present invention. A structure of the electron emission device 200 of FIG. 2 is similar to that of the electron emission device 100 of FIG. 1 and therefore detailed description of the same portion as that of FIG. 1 will be omitted.

As shown in FIG. 2, an average thickness t20 of a resin substrate 20 that is included in the electron emission device 200 may be 400 µm to 500 µm. If the average thickness t20 of the resin substrate 20 is too small, durability of the electron emission device 200 is deteriorated. In addition, if the average thickness t20 of the resin substrate 20 is too large, the electron emission device 200 is not well bent. Therefore, it is preferable to adjust the average thickness t20 of the resin substrate 20 to the foregoing range.

As shown in FIG. 2, because the resin substrate 20 has flexibility, the electron emission device 200 can emit well-focused X-rays. That is, because the resin substrate 20 may be concavely bent toward a direction in which carbon nano tubes are exposed to the outside, i.e., an upper direction, electron emission efficiency can be maximized. Hereinafter, a method of manufacturing the electron emission device 100 of FIG. 1 will be described in detail with reference to FIG. 3.

Figure 3:
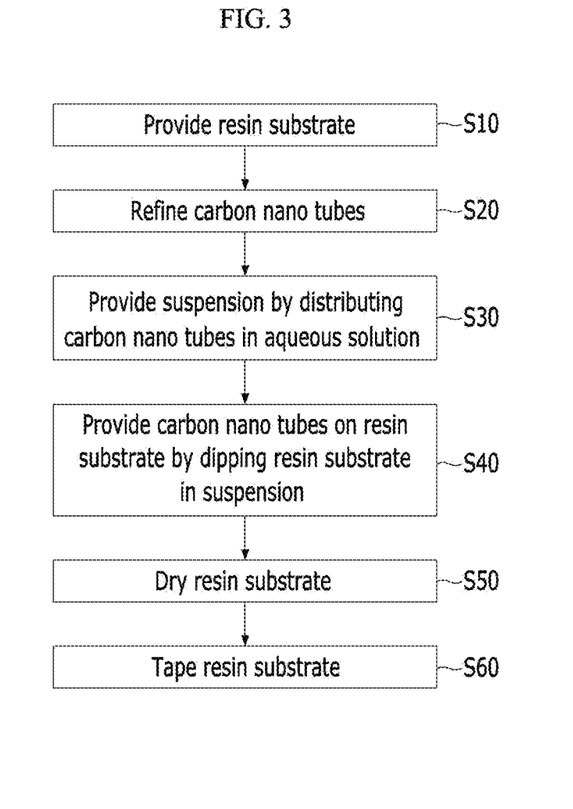
FIG. 3 is a flowchart illustrating a method of manufacturing the electron emission device of FIG. 1.

FIG. 3 is a flowchart illustrating a method of manufacturing the electron emission device 100 of FIG. 1. The method of manufacturing the electron emission device 100 of FIG. 3 is merely to illustrates the present invention and the present invention is not limited thereto. Therefore, a method of manufacturing an electron emission device may be changed into other forms.

A method of manufacturing an electron emission device includes step of providing a resin substrate (S10), step of refining carbon nano tubes (S20), step of providing a suspension by distributing the carbon nano tubes in an aqueous solution (S30), step of providing the carbon nano tubes on the resin substrate by dipping the resin substrate in the suspension (S40), step of drying the resin substrate (S50), and step of taping the resin substrate (S60). In addition, a method of manufacturing an electron emission device may further include other steps, as needed. Furthermore, the foregoing method of manufacturing an electron emission device may omit a few steps thereof.

First, a resin substrate is provided (S10). Here, as a material of the resin substrate, for example, when cellulose or polyester is used, the resin substrate has excellent absorptiveness. Therefore, when an electron emission device is produced, a suspension in which the carbon nano tubes are contained and the resin substrate contact well and thus the carbon nano tubes are attached well to the resin substrate.

Next, the carbon nano tubes are refined (S20). Step of refining the carbon nano tubes includes i) step of producing a mixed liquid by mixing the carbon nano tubes in sulfuric acid and nitric acid, ii) step of distributing the mixed liquid with ultrasonic waves, iii) step of stirring the mixed liquid that is distributed with ultrasonic waves, and iv) step of filtering the stirred mixed liquid. In addition, step of refining the carbon nano tubes may further include other steps. By mixing the carbon nano tubes to sulfuric acid and nitric acid, the carbon nano tubes may be refined with acid.

The carbon nano tubes are distributed in an aqueous solution (S30). That is, a suspension is provided by distributing the carbon nano tubes in the aqueous solution. That is, step of providing a suspension (S30) includes i) step of providing an aqueous solution in which refining water, a dispersant, and the carbon nano tubes are mixed and ii) step of distributing the aqueous solution with ultrasonic waves. Here, as a dispersant, sodium dodecyl sulfate (SDS) may be used. The dispersant functions as an insulator. A weight of refining water may be one time to two times greater than that of the dispersant. If a weight of refining water is much larger than that of the dispersant, the carbon nano tubes may not be distributed well in the aqueous solution. In addition, if a weight of refining water is much smaller than that of the dispersant, the carbon nano tubes may not be stirred well. Therefore, a weight of the refining water and a weight of the dispersant are adjusted to the foregoing ratio.

Next, by dipping the resin substrate in the suspension, the carbon nano tubes are provided on the resin substrate (S40). Therefore, by attaching the carbon nano tubes to the resin substrate, an electron emission device is produced.

Next, the resin substrate is dried (S50). That is, entire moisture of the resin substrate may be removed by heating the resin substrate in an oven. Meanwhile, in the step S50, the resin substrate may be washed before drying the resin substrate. By washing the resin substrate, a dispersant that is attached to the resin substrate may be removed.

Finally, the resin substrate is taped (S60). By taping the resin substrate, protruded portions having various heights are formed on the resin substrate. That is, by repeating a process of attaching a tap to the resin substrate and detaching a tap from the resin substrate, a surface of the resin substrate may be lifted. As a result, surface roughness Ra of the resin substrate can be maximized. Because carbon nano tubes are attached to a surface of the resin substrate having maximized surface roughness Ra, electron emission efficiency of the produced electron emission device can be greatly improved.

Hereinafter, the present invention will be described in detail through Experimental Example. Such Experimental Example illustrates the present invention and the present invention is not limited thereto.

EXPERIMENTAL EXAMPLE

A substrate was prepared. After carbon nano tubes of 25 mg were added to sulfuric acid of 10 ml and nitric acid of 10 ml, the carbon nano tubes were distributed for 1 hour using an ultrasonic wave distribution device. By mixing and filtering sulfuric acid and nitric acid to which the carbon nano tubes were added for 15 hours using a mixer, refined carbon nano tubes were obtained. Next, after injecting the carbon nano tubes into refining water of 50 ml and SDS of 30 mg and by distributing the carbon nano tubes with an ultrasonic wave distribution device during 30 minutes, a suspension in which the carbon nano tubes were well-distributed was produced. The substrate was dipped in the previously produced suspension.

Figure 4:
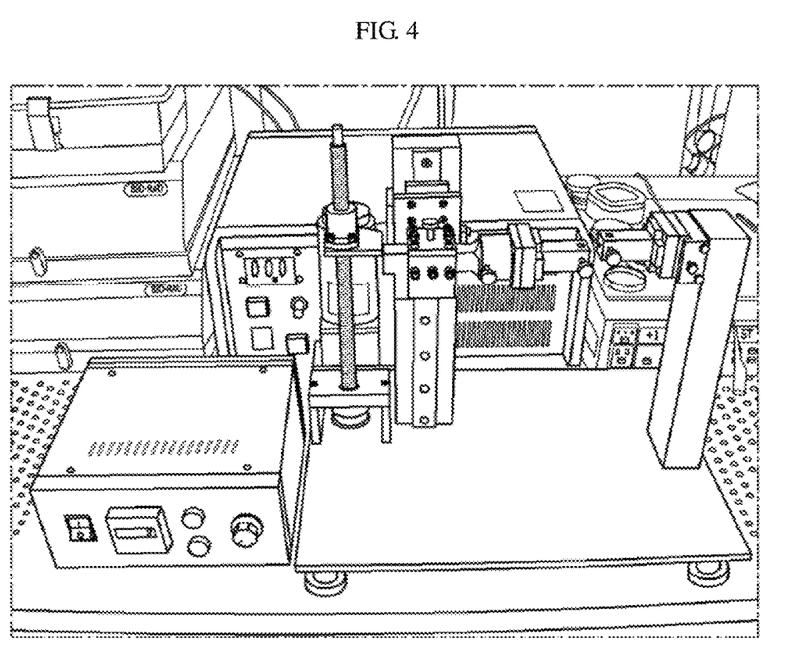
FIG. 4 is a photograph illustrating an apparatus for forming carbon nano tubes on a substrate in Experimental Example.

FIG. 4 is a photograph illustrating an apparatus for forming carbon nano tubes on a substrate in Experimental Example.

As shown in FIG. 4, by moving a substrate using a controller and a motor, the substrate is dipped in a suspension that is positioned at a lower portion of the substrate. After moving the substrate downward in a constant speed in an arrow direction, the substrate may be again moved upward. Therefore, the carbon nano tubes were attached to the substrate by deep coating the carbon nano tubes at a surface of the substrate. The resin substrate to which the carbon nano tubes were attached was completely dried at an oven of 100° C.

After fixing the produced electron emission device to a holder, an ITO substrate was positioned as a positive electrode at the opposite side. After a distance between the electron emission device, which is a negative electrode and a positive electrode is fixed to 1 mm, electric field emission characteristics and stability of the electron emission device were experimented.

Experimental Example 1

Figure 5:
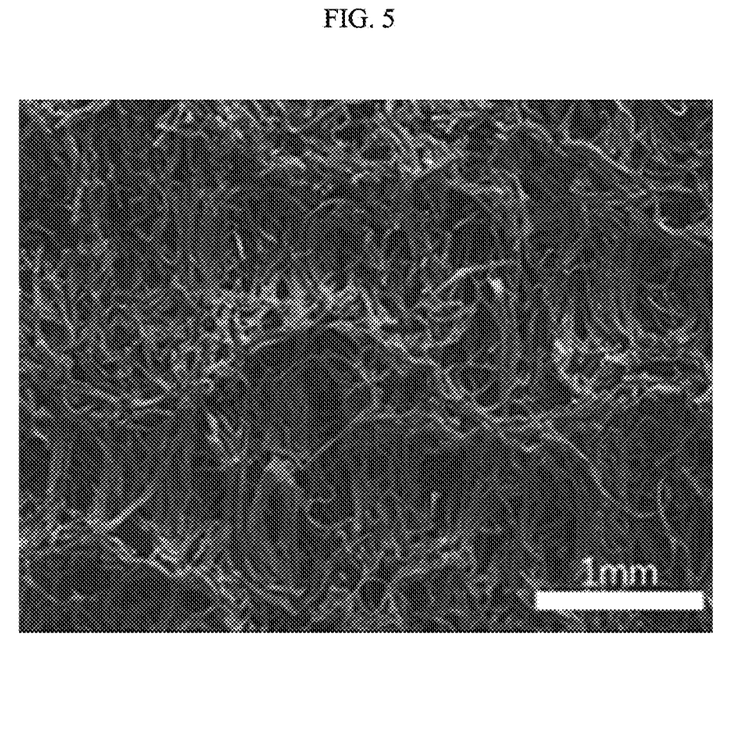
FIG. 5 is a scanning electron microscope photograph of a substrate surface that is used in Experimental Example 1.

FIG. 5 is a scanning electron microscope photograph of a substrate surface that is used in Experimental Example 1.

As shown in FIG. 5, in Experimental Example 1, a resin substrate that is made of cellulose was used. As shown in FIG. 5, it was confirmed that fiber strands having a size of several μm are randomly entangled at the resin substrate. By washing a resin substrate to which the carbon nano tubes were attached using refining water, a dispersant was removed. After the dispersant was removed, the resin substrate was dried. The rest of the processes were the same as those of the foregoing Experimental Example.

Experimental Example 2

A resin substrate that is made of cellulose was used. However, the substrate was not washed by refining water before drying the substrate. Electric field emission characteristics and stability of the electron emission device that is produced by the foregoing method were experimented. The rest of the processes were the same as those of the foregoing Experimental Example.

Experimental Example 3

The substrate to which the carbon nano tubes were attached was taped 10 times. That is, by repeating a process of attaching the tape to the resin substrate and detaching the tape from the resin substrate, the electron emission device was produced. The rest of the processes were the same as those of the foregoing Experimental Example 1.

Experimental Example 4

A resin substrate that is made of polyester was used. An entire process was the same as those of the foregoing Experimental Example 2, except for a material of the resin substrate.

Experimental Example 5

A resin substrate that is made of polyester was used. An entire process was the same as those of the foregoing Experimental Example 3, except for a material of the resin substrate.

Experimental Example 6

The substrate to which the carbon nano tubes were attached was taped 20 times. That is, by repeating a process of attaching the tape to the resin substrate and detaching the tape from the resin substrate, the electron emission device was produced. The rest of the processes were the same as those of the foregoing Experimental Example 3.

Experimental Example 7

The substrate to which the carbon nano tubes were attached was taped 30 times. That is, by repeating a process of attaching the tape to the resin substrate and detaching the tape from the resin substrate, the electron emission device was produced. The rest of the processes were the same as those of the foregoing Experimental Example 3.

Experimental Example 8

The substrate to which the carbon nano tubes were attached was taped 40 times. That is, by repeating a process of attaching the tape to the resin substrate and detaching the tape from the resin substrate, the electron emission device was produced. The rest of the processes were the same as those of the foregoing Experimental Example 3.

Experimental Example 9

The substrate to which the carbon nano tubes were attached was taped 50 times. That is, by repeating a process of attaching the tape to the resin substrate and detaching the tape from the resin substrate, the electron emission device was produced. The rest of the processes were the same as those of the foregoing Experimental Example 3.

Experimental Example 10

The substrate to which the carbon nano tubes were attached was taped 60 times. That is, by repeating a process of attaching the tape to the resin substrate and detaching the tape from the resin substrate, the electron emission device was produced. The rest of the processes were the same as those of the foregoing Experimental Example 3.

Experimental Example 11

The substrate to which the carbon nano tubes were attached was taped 70 times. That is, by repeating a process of attaching the tape to the resin substrate and detaching the tape from the resin substrate, the electron emission device was produced. The rest of the processes were the same as those of the foregoing Experimental Example 3.

Experimental Example 12

The substrate to which the carbon nano tubes were attached was taped 80 times. That is, by repeating a process of attaching the tape to the resin substrate and detaching the tape from the resin substrate, the electron emission device was produced. The rest of the processes were the same as those of the foregoing Experimental Example 3.

Experimental Example 13

The substrate to which the carbon nano tubes were attached was taped 90 times. That is, by repeating a process of attaching the tape to the resin substrate and detaching the tape from the resin substrate, the electron emission device was produced. The rest of the processes were the same as those of the foregoing Experimental Example 3.

Experimental Example 14

The substrate to which the carbon nano tubes were attached was taped 100 times. That is, by repeating a process of attaching the tape to the resin substrate and detaching the tape from the resin substrate, the electron emission device was produced. The rest of the processes were the same as those of the foregoing Experimental Example 3.

Comparative Example 1

A resin substrate that is made of stainless steel was used. An entire process was the same as those of the foregoing Experimental Example 2, except for a material of the resin substrate.

Comparative Example 2

A resin substrate that is made of stainless steel was used. An entire process was the same as those of the foregoing Experimental Example 1, except for a material of the resin substrate.

Experiment Result

Experimental Result of Strength

Figure 6:
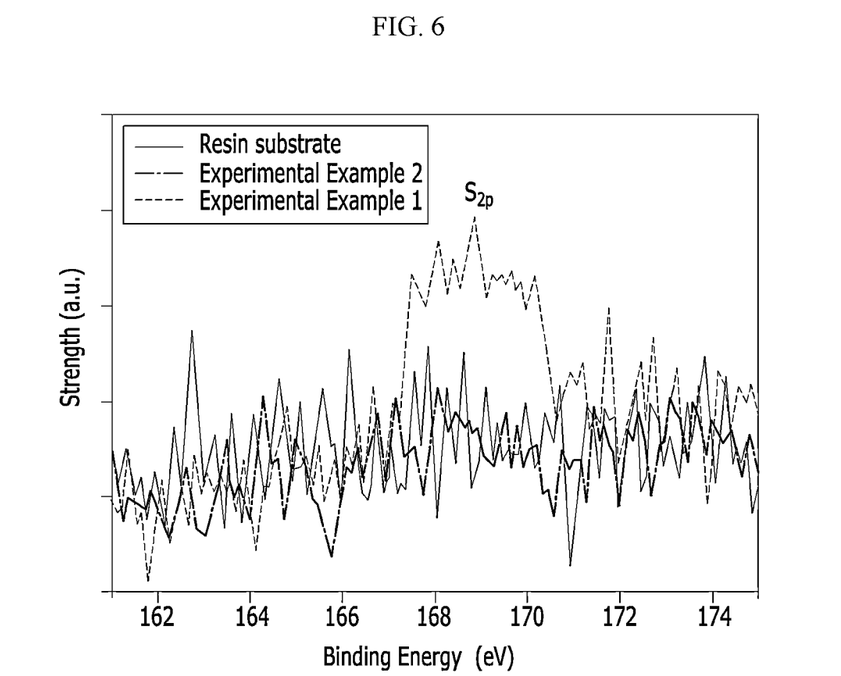
FIG. 6 is a graph illustrating strength of an electron emission device that is produced according to Experimental Examples 1 and 2.

FIG. 6 is a graph illustrating strength of an electron emission device that is produced according to Experimental Examples 1 and 2. FIG. 6 illustrates a strength graph of a resin substrate for comparison with Experimental Examples 1 and 2.

As shown in FIG. 6, it can be seen that strength of the resin substrate of Experimental Example 1 was improved larger than self strength of the resin substrate and strength of the resin substrate of Experimental Example 2. This is because a dispersant that functions as an insulator in Experimental Example 1 was well removed through a washing process. Therefore, in Experimental Example 1, a resin substrate having improved strength was produced through a washing process.

Experimental Result of Scanning Electron Microscope

Figure 7:
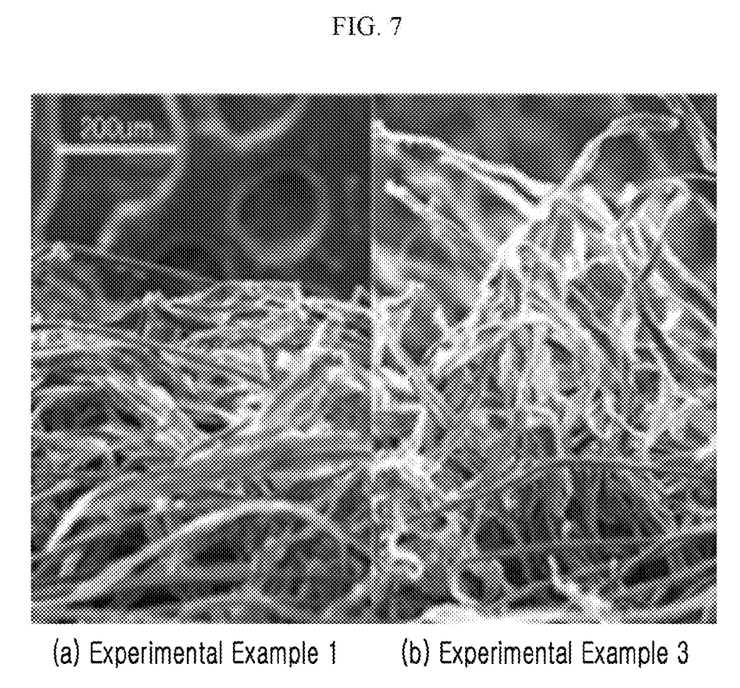
FIG. 7 is a scanning electron microscope photograph of a substrate that is included in an electron emission device that is produced according to Experimental Example 1 and Experimental Example 3.

FIG. 7 is a scanning electron microscope photograph of a substrate that is included in an electron emission device that is produced according to Experimental Examples 1 and 3. FIG. 7A illustrates a scanning electron microscope photograph of a substrate that is produced according to Experimental Example 1, and FIG. 7B illustrates a scanning electron microscope photograph of a substrate that is produced according to Experimental Example 3.

As shown in FIG. 7, in Experimental Example 3, when taping the substrate, it was observed that a surface of the substrate was greatly lifted. Therefore, because a surface of a tip shape greatly increases at the substrate, it is estimated that electron emission efficiency of the electron emission device can be greatly improved.

Figure 8:
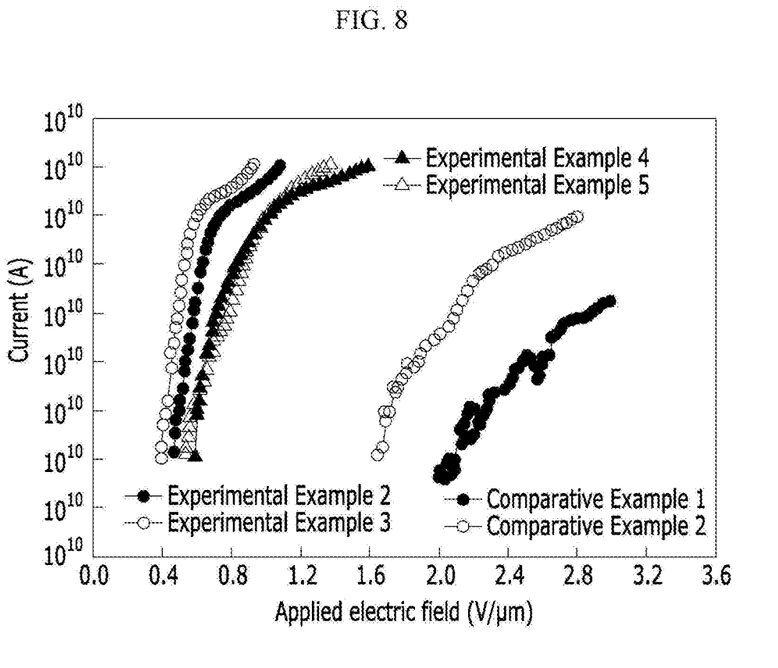
FIG. 8 is a graph illustrating a current according to an applied electric field of an electron emission device that is produced according to Experimental Examples 2 to 5 and Comparative Examples 1 and 2.

Experimental Result of Electron Emission Characteristic According to Application of Material FIG. 8 is a graph illustrating a current according to an applied electric field of an electron emission device that is produced according to Experimental Examples 2 to 5 and Comparative Examples 1 and 2.

As shown in FIG. 8, Experimental Examples 2 and 3 using a resin substrate that is made of cellulose emitted a current of a similar quantity even in a lower applied electric field, compared with Experimental Examples 4 and 5 using a resin substrate that is made of polyester. Furthermore, it was determined that in Experimental Examples 2 to 5, a current amount generating according to an applied electric field is much larger, compared with Comparative Examples 1 and 2. Meanwhile, it was determined that Experimental Examples 3 and 5 in which a washing process was performed are excellent in view of electron emission characteristics, compared with Experimental Examples 2 and 4 in which a washing process was not performed. Therefore, when a resin substrate having a hydrophilic property and flexibility is used according to Experimental Example of the present invention, it was confirmed that an electron emission device has excellent electron emission characteristics.

Experimental Result of Electron Emission Characteristic According to Surface Roughness Adjustment Surface roughness of a resin substrate that is included in an electron emission device that is produced according to Experimental Example 3 and Experimental Examples 6 to 14 and electron emission characteristics of the electron emission device were measured. As electron emission characteristics of the electron emission device, a threshold voltage was measured, and an electric field emission improvement factor was calculated. A result thereof was shown in Table 1.

TABLE 1

| NO | Experimental Example | The number of taping | Average surface roughness (Ra) | Threshold voltage (V) | Electric field emission improvement factor (×10$^4$) |
|---|---|---|---|---|---|
| 1 | Experimental Example 3 | 10 times | 1.3 μm | 1.51 | 2.16 |
| 2 | Experimental Example 6 | 20 times | 1.8 μm | 1.50 | 2.19 |
| 3 | Experimental Example 7 | 30 times | 2.7 μm | 1.45 | 3.70 |
| 4 | Experimental Example 8 | 40 times | 3.9 μm | 1.32 | 4.82 |
| 5 | Experimental Example 9 | 50 times | 5.4 μm | 1.12 | 6.01 |
| 6 | Experimental Example 10 | 60 times | 7.2 μm | 0.88 | 7.27 |
| 7 | Experimental Example 11 | 70 times | 9.2 μm | 0.69 | 9.73 |
| 8 | Experimental Example 12 | 80 times | 9.4 μm | 0.62 | 9.95 |
| 9 | Experimental Example 13 | 90 times | 9.5 μm | 0.78 | 8.51 |
| 10 | Experimental Example 14 | 100 times | 9.7 μm | 0.81 | 8.17 |

As described in Table 1, as the number of taping increases, surface roughness Ra also increased. Accordingly, in Experimental Example 10, as a threshold voltage decreases and an electric field emission improvement factor increases, it was determined that electron emission characteristics greatly improve. However, in Experimental Examples 3 and Experimental Examples 6 to 9, it was confirmed that characteristics thereof are relatively bad. Further, in Experimental Examples 12 and 13, it was determined that electron emission characteristics of an electron emission device have an optimal value.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electron emission device, comprising:
   a hydrophile resin substrate; and
   carbon nano tubes that are positioned on the resin substrate,
   wherein average surface roughness Ra of the resin substrate is 7.3 μm to 9.7 μm.

2. The electron emission device of claim 1, wherein the average surface roughness Ra of the resin substrate is 9.2 μm to 9.4 μm.

3. The electron emission device of claim 1, wherein the carbon nano tubes has a diameter of 10 nm to 15 nm, when the carbon nano tubes are a multi-walled carbon nano tube.

4. The electron emission device of claim 1, wherein the carbon nano tubes has a diameter of 1 nm to 2 nm, when the carbon nano tubes are a single wall carbon nano tube.

5. The electron emission device of claim 1, wherein the resin substrate comprises a plurality of fiber strands, and an average length of the plurality of fiber strands is 1 mm to 2 mm.

6. The electron emission device of claim 1, wherein the resin substrate has flexibility.

7. The electron emission device of claim 6, wherein an average thickness of the resin substrate is 400 μm to 500 μm.

8. The electron emission device of claim 7, wherein the resin substrate is concavely bent toward a direction in which the carbon nano tubes are exposed to the outside.

9. The electron emission device of claim 1, wherein the resin substrate comprises at least one resin that is selected from a group consisting of cellulose and polyester.

* * * * *